(12) United States Patent
Li et al.

(10) Patent No.: US 12,314,046 B2
(45) Date of Patent: May 27, 2025

(54) DEVICE STATE EVALUATION SYSTEM AND EVALUATION METHOD BASED ON CURRENT SIGNALS

(71) Applicant: Industrial Technology Research Institute, Hsinchu (TW)

(72) Inventors: Meng-Lin Li, Hsinchu (TW); Yu-Hung Pai, Hsinchu (TW); Hung-Tsai Wu, Hsinchu (TW); Chun-Chieh Wang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 311 days.

(21) Appl. No.: 18/064,895

(22) Filed: Dec. 12, 2022

(65) Prior Publication Data
US 2024/0210932 A1    Jun. 27, 2024

(51) Int. Cl.
G05B 23/02    (2006.01)

(52) U.S. Cl.
CPC ....... G05B 23/024 (2013.01); G05B 23/0221 (2013.01)

(58) Field of Classification Search
CPC .......................... G05B 23/024; G05B 23/0221
See application file for complete search history.

(56) References Cited

U.S. PATENT DOCUMENTS

| | | | |
|---|---|---|---|
| 6,289,735 | B1 | 9/2001 | Dister et al. |
| 6,301,572 | B1 | 10/2001 | Harrison |
| 10,359,473 | B2 | 7/2019 | Qiao et al. |
| 11,022,633 | B2 | 6/2021 | Ismail et al. |
| 2017/0356936 | A1 | 12/2017 | Ismail et al. |

(Continued)

FOREIGN PATENT DOCUMENTS

| | | |
|---|---|---|
| CN | 1230869 C | 12/2005 |
| CN | 102661783 A | 9/2012 |
| CN | 103698699 B | 8/2017 |

(Continued)

OTHER PUBLICATIONS

Gang Niu et al., Motor Fault Diagnostics Based on Current Signatures: A Review, 2023, IEEE Transactions on Instrumentation and Measurement, vol. 72, pp. 1-19 (Year: 2023).*

(Continued)

*Primary Examiner* — Mi'schita' Henson
(74) *Attorney, Agent, or Firm* — HSML P. C.

(57) ABSTRACT

A device state evaluation method based on current signals is applied to a target device that is powered on, the device state evaluation method includes: collecting a plurality of target current signals corresponding to the target device via an acquisition module; performing a signature extraction operation and a normalization operation via a computing module to obtain a target matrix by using the plurality of target current signals; and performing a diagnosis operation on the target matrix via a diagnosis module to identify whether the target device is in a malfunction state, where an identification result of the diagnosis operation is used as target information. Therefore, whether the target device is in (Continued)

the malfunction state can be evaluated by analyzing the plurality of target current signals. A device state evaluation system is also provided.

8 Claims, 14 Drawing Sheets

(56) References Cited

U.S. PATENT DOCUMENTS

2024/0353829 A1* 10/2024 Wang .................. G05B 23/024

FOREIGN PATENT DOCUMENTS

| CN | 107584334 B | 5/2019 |
|---|---|---|
| CN | 110472587 A | 11/2019 |
| CN | 108426713 B | 5/2020 |
| CN | 111094927 A | 5/2020 |
| CN | 112052796 A | 12/2020 |
| CN | 112326210 A | 2/2021 |
| CN | 114330096 A | 4/2022 |
| CN | 115345192 A | 11/2022 |
| CN | 115371988 A | 11/2022 |
| CN | 115422687 A | 12/2022 |
| TW | I234610 B | 6/2005 |
| TW | I422460 B | 1/2014 |
| TW | 202221435 A | 6/2022 |
| WO | 2019061006 A1 | 4/2019 |

OTHER PUBLICATIONS

Office Action issued in Taiwan Patent Application No. 11320320960, dated Apr. 1, 2024.

Martin Valtierra-Rodriguez et al., "Convolutional Neural Network and Motor Current Signature Analysis during the Transient State for Detection of Broken Rotor Bars in Induction Motors", Sensors, Published: Jul. 3, 2020.

Przeglad Elektrotechniczny "Detection and classification of faults in induction motor by means of motor current signature analysis and stray flux monitoring", ISSN 0033-2097, R. 92 NR Apr. 2016.

Daniele Angelosante et al., "Toward embedded broken rotor bars detection in induction machines", 2012 IEEE International Conference on Industrial Technology, Jun. 4, 2012.

Sukhjeet Singh et al., "Motor Current Signature Analysis for Bearing Fault Detection in Mechanical Systems", ScienceDirect, Procedia Materials Science, vol. 6, 2014, pp. 171-177.

Alberto Bellini et al., "High Frequency Resolution Techniques for Rotor Fault Detection of Induction Machines", IEEE Transactions on Industrial Electronics, vol. 55, Issue: 12, Dec. 2008, pp. 4200-4209.

S. Guedidi et al., "Broken bar fault diagnosis of induction motors using MCSA and neural network", 8th IEEE Symposium on Diagnostics for Electrical Machines, Power Electronics & Drives, Oct. 31, 2011.

* cited by examiner

DEVICE STATE EVALUATION SYSTEM AND EVALUATION METHOD BASED ON CURRENT SIGNALS

BACKGROUND

1. Technical Field

The present disclosure relates to an evaluation system and method, and more particularly, to a device state evaluation system and method for evaluating whether a target device is in a malfunction state by analyzing current signals.

2. Description of Related Art

With the rapid development of industrial automation, it is imperative to overhaul the machine tools of each production line to facilitate the smooth operation of the production line.

However, there are a large number of various devices such as asynchronous motors and gearboxes on the production line during mass production. These devices cannot have the same testing standards, so operators need to test different standards for various gearboxes and motors, resulting in extremely high testing costs. Moreover, the malfunction conditions of various gearboxes and motors are different, and the monitoring apparatus is often unable to provide information on the malfunction state of various equipment, so that the operator needs to figure out where the failure/fault is, and thus misjudgment is prone to occur.

Therefore, how to adopt a method that can instantly reflect the states of various equipment has become a difficult problem to be overcome urgently in the industry.

SUMMARY

A device state evaluation method based on current signals is applied to a target device that is powered on, the device state evaluation method comprising: providing a plurality of target current signals corresponding to the target device to a device state evaluation system: performing a time-frequency domain analysis and processing on the plurality of target current signals to obtain a plurality of statistical values, performing a frequency domain analysis on the plurality of target current signals, and performing a signature extraction operation on signature frequencies of the target device to obtain a frequency matrix: integrating the plurality of statistical values with the frequency matrix to obtain a target matrix: and performing a diagnosis operation on the target matrix to identify whether the target device is in a malfunction state, wherein an identification result of the diagnosis operation is used as target information.

A device state evaluation system based on current signals is applied to a target device that is powered on, the device state evaluation system comprising: an acquisition module configured to collect a plurality of target current signals corresponding to the target device: a computing module communicatively connected to the acquisition module to receive the plurality of target current signals, wherein the computing module performs a time-frequency domain analysis and processing on the plurality of target current signals to obtain a plurality of statistical values, performs a frequency domain analysis on the plurality of target current signals, performs a signature extraction operation on signature frequencies of the target device to obtain a frequency matrix, and integrates the plurality of statistical values with the frequency matrix to obtain a target matrix: and a diagnosis module communicatively connected to the computing module to receive the target matrix and performing a diagnosis operation on the target matrix to identify whether the target device is in a malfunction state, wherein an identification result of the diagnosis operation is used as target information.

As can be seen from the above, in the device state evaluation system and method based on current signals of the present disclosure, by analyzing the target current signals, it is possible to evaluate whether the target device is in a malfunction state. Therefore, compared with the prior art, in the production line of various equipment, such as asynchronous motors and gearboxes, the operator can easily know the states of various gearboxes and motors, thus reducing the cost of inspection. Moreover, the diagnosis operation can provide malfunction state messages of various gearboxes and motors, so as to avoid misjudgment by the operator.

BRIEF DESCRIPTION OF THE DRAWINGS

FIG. 2B-1 is a schematic diagram of target current signals received by the computing module of FIG. 1A.

FIG. 2B-2 to FIG. 2B-9 are schematic diagrams of statistical information obtained by decomposing the target current signals in FIG. 2B-1 via wavelet packets.

FIG. 2D-1 to FIG. 2D-3 are schematic diagrams illustrating the process of the non-dimensionalization operation of fault signatures performed by the computing module of FIG. 1A.

FIG. 3 is a flowchart illustrating the operation of a diagnosis module of FIG. 1A.

FIG. 4 is a flowchart illustrating a device state evaluation method based on current signals according to the present disclosure.

DETAILED DESCRIPTIONS

The following describes the implementation of the present disclosure with examples. Those familiar with the art can easily understand the other advantages and effects of the present disclosure from the content disclosed in this specification.

It should be understood that, the structures, ratios, sizes, and the like in the accompanying figures are used to illustrate the content disclosed in the present disclosure for one skilled in the art to read and understand, rather than to limit the conditions for practicing the present disclosure. Any modification of the structure, alteration of the ratio relationship, or adjustment of the size without affecting the possible effects and achievable proposes should still fall in the range compressed by the technical content disclosed in the present disclosure. Meanwhile, terms such as "on," "first," "second," "third," "fourth," "a," "one," and the like used herein are merely used for clear explanation rather than limiting practical range by the present disclosure, and thus, the alteration or adjustment of relative relationship thereof without altering the technical content should be considered in the practical scope of the present disclosure.

Figure 1A:
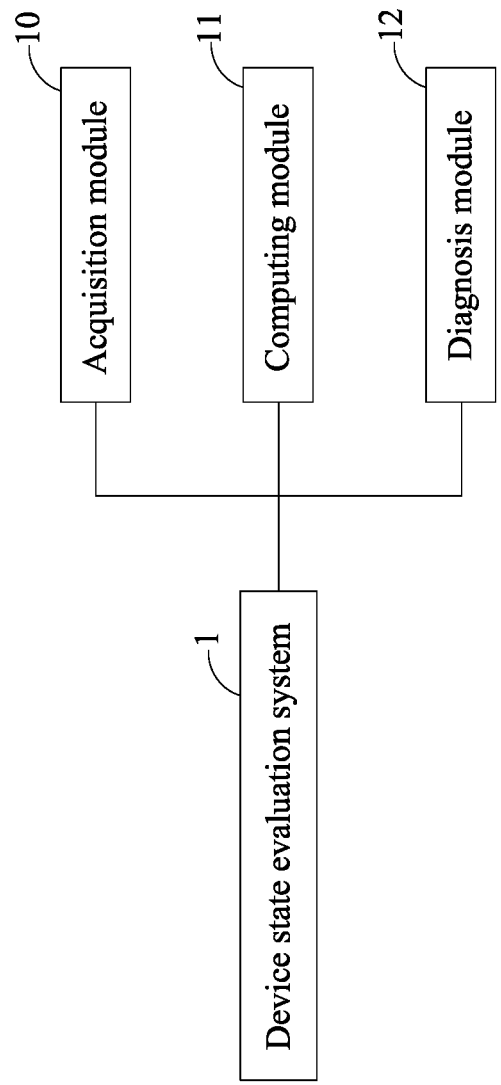
FIG. 1A is a schematic diagram of an architecture configuration of a device state evaluation system based on current signals according to the present disclosure.

FIG. 1A is a schematic diagram of an architecture configuration of a device state evaluation system 1 based on current signals according to the present disclosure. As shown in FIG. 1A, the device state evaluation system 1 is to perform state evaluation of a target device by analyzing current information, and the device state evaluation system 1 includes: an acquisition module 10, a computing module 11 and a diagnosis module 12. The present disclosure does not limit the possible integration, replacement, or increase or decrease configuration of each component of the above-mentioned architecture configuration.

In an embodiment, the device state evaluation system 1 is configured in a computer host (not shown) to perform state evaluation for a transmission device (i.e., a target device) having a motor and/or a gear set. For example, the motor is of electric type and operates by electricity, and the gear set can be in the form of a reducer or a gearbox, etc., and the gear set is linked with the motor so that the power provided by the motor can be transmitted to the required place with the gear set. It should be understood that there are many types of target devices related to energization, and are not limited to the above-mentioned transmission device.

The acquisition module 10 is used to collect a plurality of target current signals. In an embodiment, a current sensor (such as a non-destructive open-type current sensor) can be installed to sense the current of the motor of the target device during operation, and a current stabilizing circuit of the current sensor and a high-speed extractor are connected via communication, so as to accurately acquire the target current signals of the motor of the target device during operation.

Further, in order to achieve the high-speed acquisition of the target current signals and analyze the effective current signals (i.e., the target current signals) later, the acquisition module 10 may include two parts, as described below.

The first part of the acquisition module 10 is the current stabilizing circuit, which converts the modeled current into a voltage, and uses a common ground resistance and a Wheatstone bridge to form an anti-noise circuit (such as a current anti-noise stabilization circuit), and the resistance can be adjusted with different current levels of the motor for the use of the high-speed extractor. For example, the current anti-noise stabilization circuit is used to convert the current into a voltage signal, and at the same time, the current anti-noise stabilization circuit is grounded to shield the noise, and the resistance can be adjusted to obtain a better conversion voltage signal-to-noise ratio and voltage-to-current ratio.

The second part of the acquisition module 10 counts the peak value of each frequency to determine the target current signals. The main reason is that the frequency of the current supply is significantly different from other frequencies in the frequency spectrum, so screening is needed.

Also, according to the first part and the second part, the operation process of the acquisition module 10 is as follows, and reference can be made to FIG. 1B.

In step S10, initial information is obtained via the current sensor, wherein the initial information includes initial current signals corresponding to various frequencies. In step S11, the current sensor transmits the initial information to the high-speed extractor and the first part of the acquisition module 10 (the current stabilizing circuit) to process the initial information to obtain a better conversion voltage signal-to-noise ratio and voltage-to-current ratio. For instance, the acquisition frequency of the high-speed extractor can be at least 4000 ks/s, and the data resolution can be 16 bits or above.

In step S12, the second part of the acquisition module 10 screens various initial current signals in the initial information to determine whether the various initial current signals are the target current signals of the motor during operation.

Figure 1B:
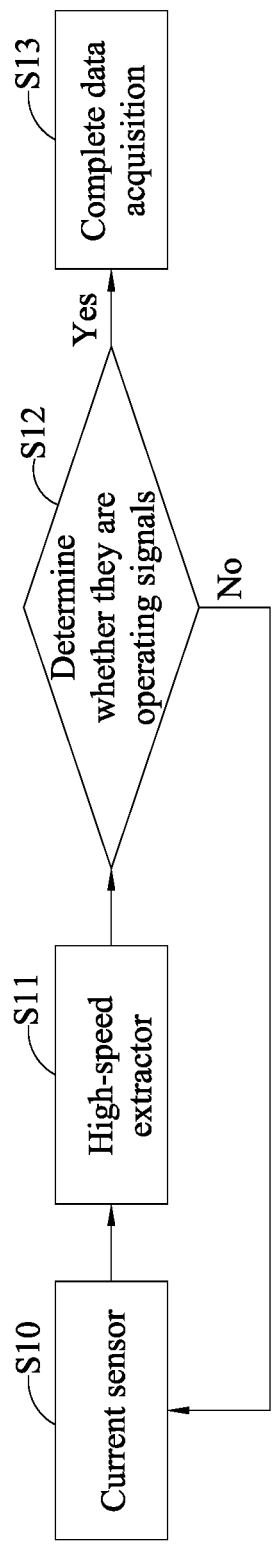
FIG. 1B is a flowchart illustrating the operation of an acquisition module of FIG. 1A.
Figures 1, 1C:
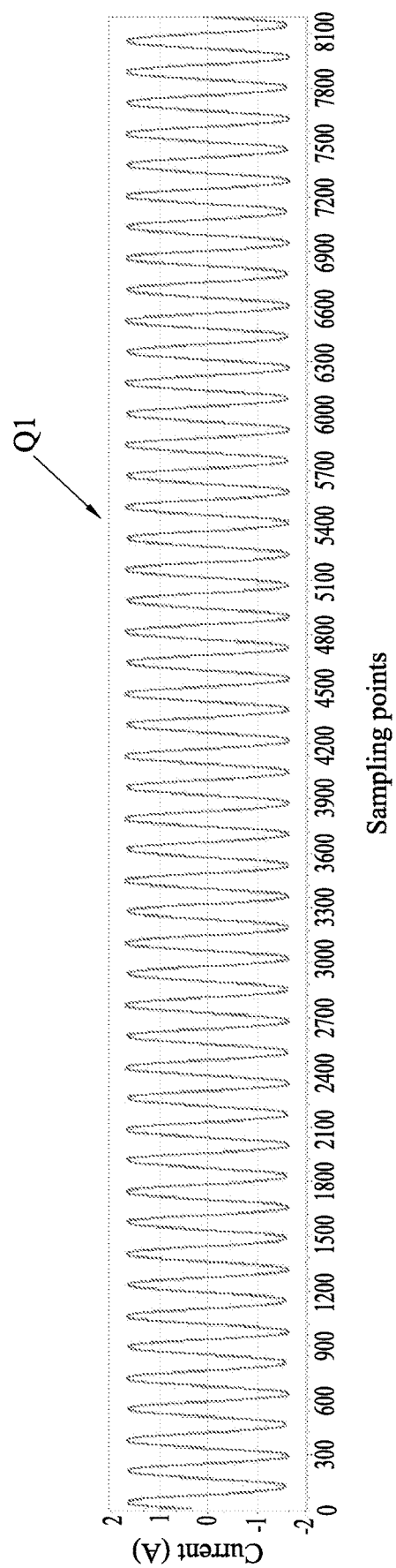
FIG. 1C-1 to FIG. 1C-2 are schematic diagrams illustrating the operation of a second part of the acquisition module of FIG. 1A.
Figures 1, 1C, 2:
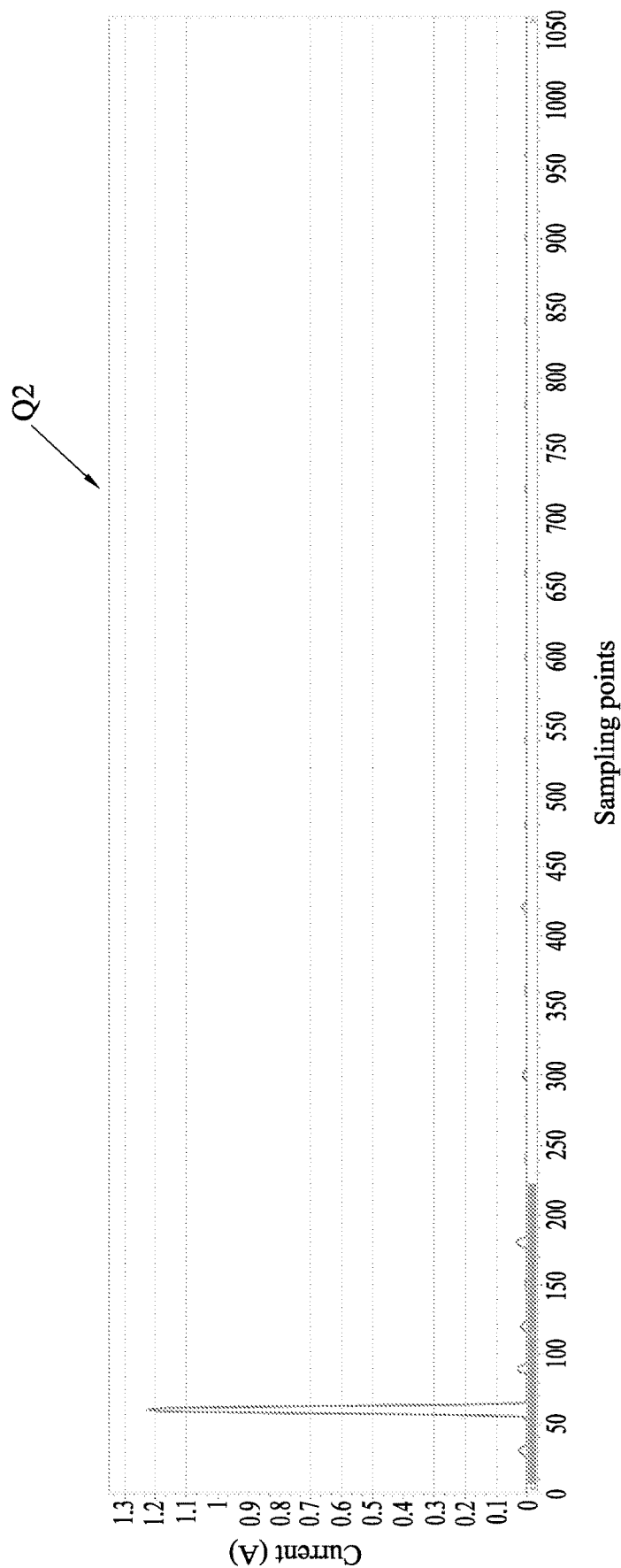

In an embodiment, in the first step, the operation process of the second part of the acquisition module 10 includes using a sampling frequency of 10240 Hz first, acquiring 8192 points of signal per second, and performing Fourier transform (conversion information Q2 as shown in FIG. 1C-2) on the initial current signal (initial information Q1 as shown in FIG. 1C-1). Then, in the second step, the first few maximum values in the converted initial current signal are found, wherein the first few can be selected according to the following method, such as dividing ten by (sampling frequency 10240/signal acquisition 8192 per second) to get the value eight, so the number within eight can be selected (such as the first six). Then, in the third step, the frequency positions corresponding to the maximum values of the first six initial current signals are listed. Finally, in the fourth step, if the standard deviation of the acquired frequencies is less than ten and the average value is greater than the threshold value of 5 Hz, then it is determined to be the target current signal.

It should be understood that parameters such as sampling frequency, signal acquisition per second and threshold value can be adjusted according to requirements, and are not limited to the above.

In step S13, the second part of the acquisition module 10 counts the peak value of each frequency to use the initial current signal corresponding to the current supply frequency as the target current signal to complete the data acquisition operation.

The computing module 11 is communicatively connected to the acquisition module 10 to receive the target current signals for signature acquisition (e.g., feature acquisition) and normalization operations, that is, in order to eliminate the influence of motors of different sizes and different types of gear sets on the current signals and obtain meaningful input values for the subsequent machine learning model, the target current signals are subjected to signature acquisition operation and normalization operation.

In an embodiment, the signature acquisition operation utilizes a wavelet packet time-frequency domain to analyze statistical values of each frequency, and utilizes Fourier transform to match the motor current signature analysis (MCSA) theory, to select signature values related to the damaged operating state, and then the normalization operation is carried out to obtain a target matrix such as a signature normalization matrix.

Figure 2A:
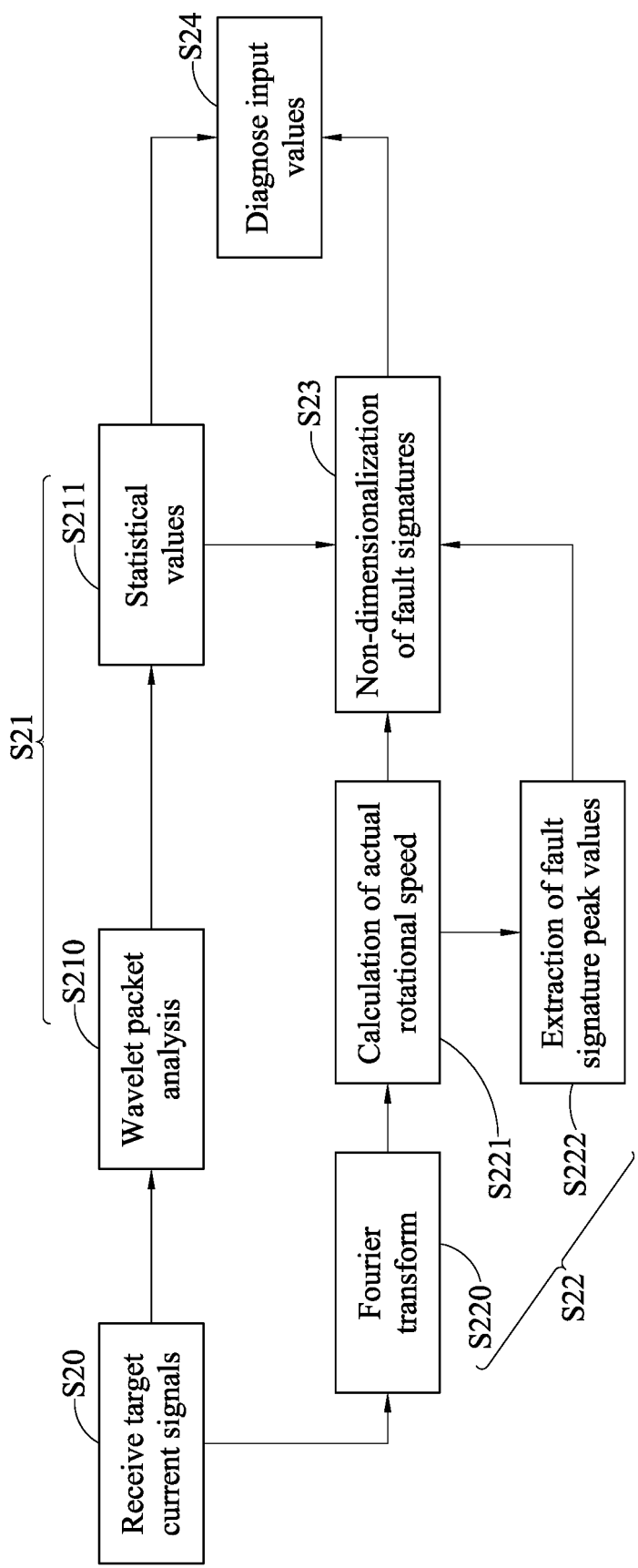
FIG. 2A is a flowchart illustrating the operation of a computing module of FIG. 1A.

Further, the operation process of the computing module 11 is as follows, and reference can be made to FIG. 2A.

In step S20, the computing module 11 receives the target current signals.

In step S21, a time-frequency domain analysis and processing is performed on the target current signals by a wavelet packet decomposition method, so as to separate important time-frequency domains and perform statistical value analysis, wherein the statistical value includes root mean square (RMS), kurtosis, spectral kurtosis, randomness, or other parameters.

Figures 1, 2B:
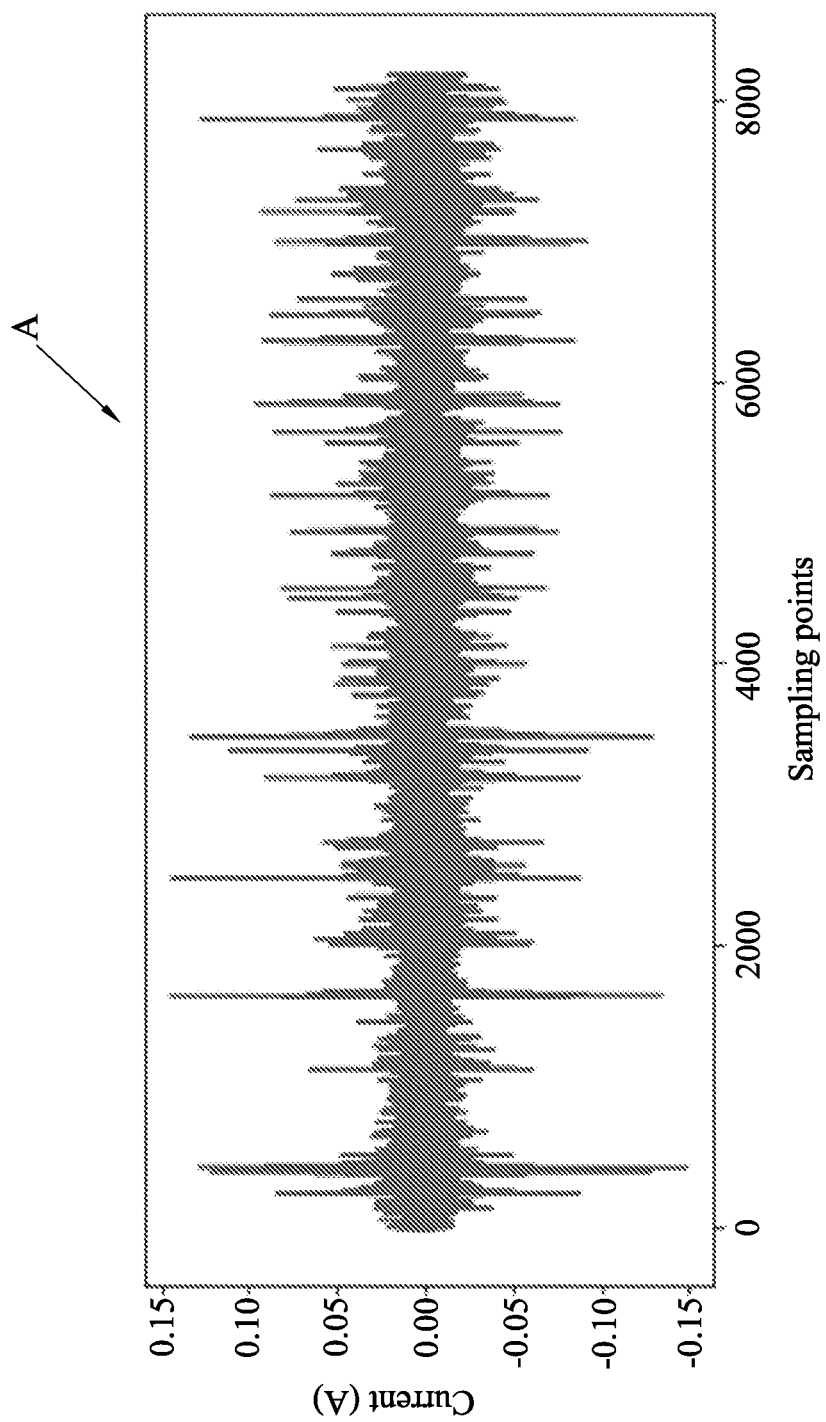

For example, in step S210, the acquired target current signal (current information A as shown in FIG. 2B-1) is subjected to second-order wavelet packet analysis to obtain four frequency bands. Then, in step S211, three statistical values such as root mean square, kurtosis and spectral kurtosis of each frequency band are calculated to obtain twelve statistical values, such as eight statistical information B1, B2, B3, B4, B5, B6, B7, B8 shown in FIG. 2B-2 to FIG. 2B-9.

In one embodiment, wavelet packet decomposition is used as the frequency band decomposition method of the target current signals. The formula of the wavelet packet decomposition is based on the orthogonal wavelet function, and it is known that $$\varphi_{j+1,k}(x) = 2^{j+\frac{1}{2}}\varphi(2^{j+1}x - k),$$

$k \in Z$ is a set of orthogonal basis of $V_{j+1}$ space, and it is necessary to construct a set of functions $$\psi_{j,k}(x) = 2^{\frac{j}{2}}\psi(2^j x - k),$$

$k \in$, so that the spanned space $W_j$ is the orthogonal complement space of $V_j$ in $V_{j+1}$, and its establishment process is as follows:

$\varphi(x) = \sqrt{2}\Sigma h_k \varphi(2x-k)$ wherein $h_k = \sqrt{2}\int_{-\infty}^{+\infty}\varphi(x)\overline{\varphi(2x-k)}dx$, and the wavelet formula:

$\Psi(x) = \sqrt{2}\Sigma g_k \varphi(2x-k)$ wherein $g_k = (-1)^k \bar{h}_{1-k}$.

Then, the wavelet packet decomposition decomposes the $W_j$ space, and the subspace $V_j$ and the wavelet subspace $W_j$ are represented by a $U_j^n$, and the following space decomposition can be obtained:

$$U_{j+1}^n U_j^{2n} \oplus U_j^{2m+1}, j \in Z; n \in Z_+$$

wherein $\{\mu_{n,j}(x-k)\}_{k \in z}$ is the standard orthonormal basis of the space $U_j^n$, so the wavelet packet decomposition algorithm is:

$$\mu_{2n}(x) = \Sigma h_k \mu_n(2x-k)$$

$$\mu_{2n+1}(x) = \Sigma g_k \mu_n(2x-k)$$

Therefore, the wavelet packet decomposition method is to decompose the original time-domain signal into time-domain signals of different frequency bands, and monitor the statistical values of root mean square values, margins, kurtosis, or other appropriate parameters of each frequency band. It should be understood that the wavelet packet decomposition method needs at least second-order analysis to obtain valid data.

In step S22, the target current signals are analyzed in the frequency domain by a Fourier transform method such as Fast Fourier Transform (FFT), wherein the analysis results are based on the MCSA theory to perform signature acquisition operation on the signature frequencies of the target device (such as motors and gear sets).

For example, in step S220, the acquired target current signals are subjected to Fourier transform, wherein the Fourier transform is transformed from the time domain to the frequency domain, so as to locate the signal changing within a specific time range. Next, in step S221, the eccentric frequency and rotor slot harmonics (RSH) frequency are used to analyze the actual rotational speed, and the slip is calculated, and parameters such as power supply frequency (fs), frequency slip (s) and grades (p) are plugged into any fault signature calculation formula, as shown in Table 1, to calculate the location of the fault frequency (or signature frequency), such as rotor unbalanced failure $f_b$(k=1, 2, 3), rotor broken bar $f_{st}$(n=1, 2, 3), stator winding failure $f_{st}$(n=1, 2, 3; k=1, 3, 5) and bearing inner ring failure $f_{IF}$.

TABLE 1

| Failure/Fault form | Detection frequency method | Parameter meaning |
| --- | --- | --- |
| Rotor unbalance failure | $f_{rt} = f_s \times (1 \pm 2s)$ | $f_s$ = power frequency |
| Unbalanced rotor (possibly caused by broken bar) | $f_b = f_s \times (1 \pm 2ks)$<br>$s = \dfrac{n_s - n}{n_s}$<br>$n_s = \dfrac{120 f_s}{p}$ | k = constant<br>s = slip<br>p = grades |
| Rotor eccentric (static) | $f_{ecc} = f_s \left[ 1 \pm \dfrac{k(1-s)}{p} \right]$ | |
| Rotor air gap eccentric failure (dynamic + static) | $f_{ecc} = f_s \left[ (Z_r \pm n_d)\dfrac{(1-s)}{p} \pm n_{\omega s} \right]$ | $f_s$ = power frequency<br>$Z_r$ = number of rotor slots<br>$n_d$ = 1 for dynamic eccentricity, 0 for static eccentricity<br>p = grades<br>s = slip<br>$n_{\omega s}$ = 1, 3, 5, 7, . . . |

TABLE 1-continued

| Failure/Fault form | Detection frequency method | Parameter meaning |
|---|---|---|
| Broken rotor bar | $f_{st} = f_s\left[\dfrac{n(1-s)}{p} \pm s\right]$ | $f_s$ = power frequency<br>p = grades<br>s = slip |
| Stator winding failure | $f_{st} = f_s\left[\dfrac{n(1-s)}{p} \pm k\right]$ | n = 1, 2, 3, ...<br>k = 1, 3, 5, ... |
| Bearing inner ring failure | $f_{IF} = -\dfrac{N}{2}f_r\left[1 + \dfrac{D_B}{D_C}\cos\beta\right]$ | N = number of rolling elements<br>$D_B$ = rolling element diameter<br>$D_C$ = pitch diameter |
| Bearing outer ring failure | $f_{OF} = -\dfrac{N}{2}f_r\left[1 - \dfrac{D_B}{D_C}\cos\beta\right]$ | $D_I$ = inner ring diameter<br>$f_r$ = rotation frequency<br>$\beta$ = rolling element contact angle |
| Bearing ball failure | $f_B = -\dfrac{D_I}{2D_B}f_r\left[1 - \left(\dfrac{D_B}{D_C}\cos\beta\right)^2\right]$ | |
| Bearing retainer failure | $f_{CF} = \dfrac{1}{2}f_r\left[1 - \dfrac{D_B}{D_C}\cos\beta\right]$ | |
| Gear failure | $f_{gear} = kf_s \pm mf_n$ | $f_s$ = power frequency<br>$f_n$ = N-grade gear meshing frequency<br>k = constant (k = 1, 2, 3, ...)<br>m = constant (m = 1, 2, 3, ...)<br>n = $n^{th}$ grade gearbox |

Figures 2, 2B, 3, 4, 5:
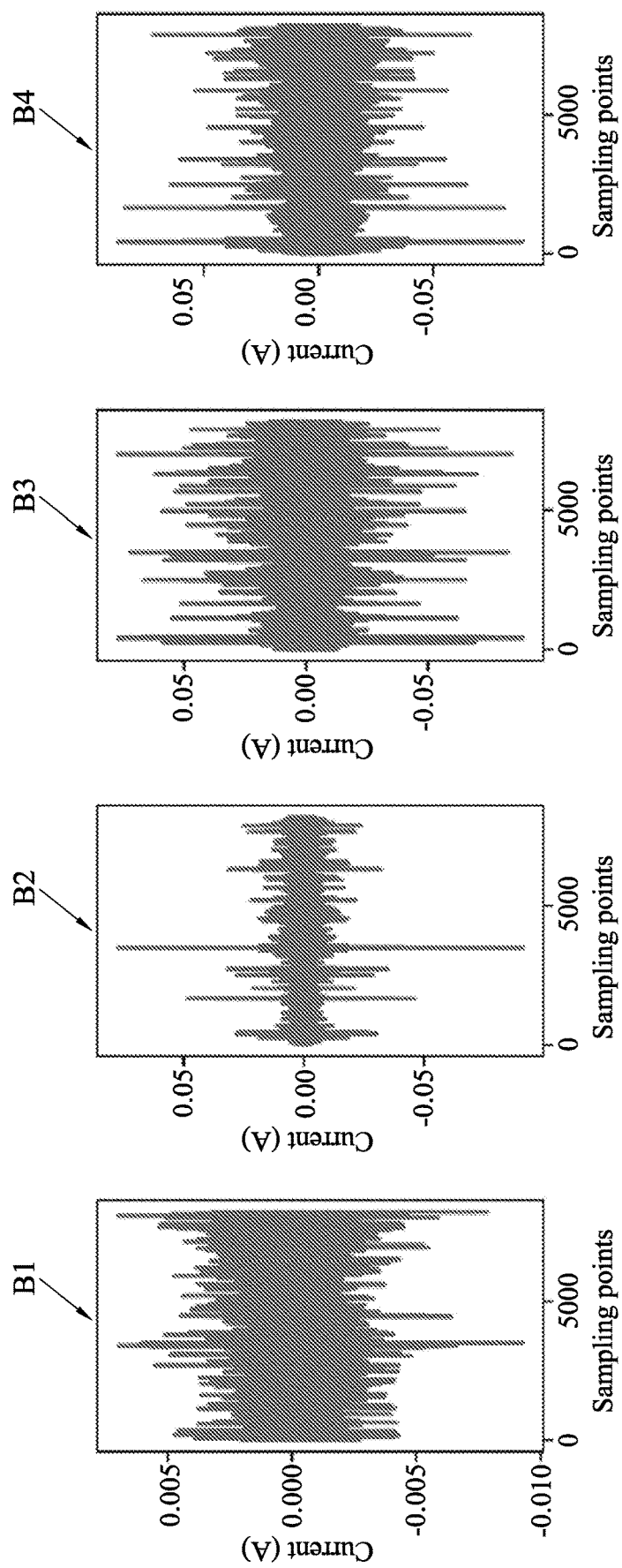
Figures 2, 2B, 3, 4, 5, 6, 7, 8, 9:
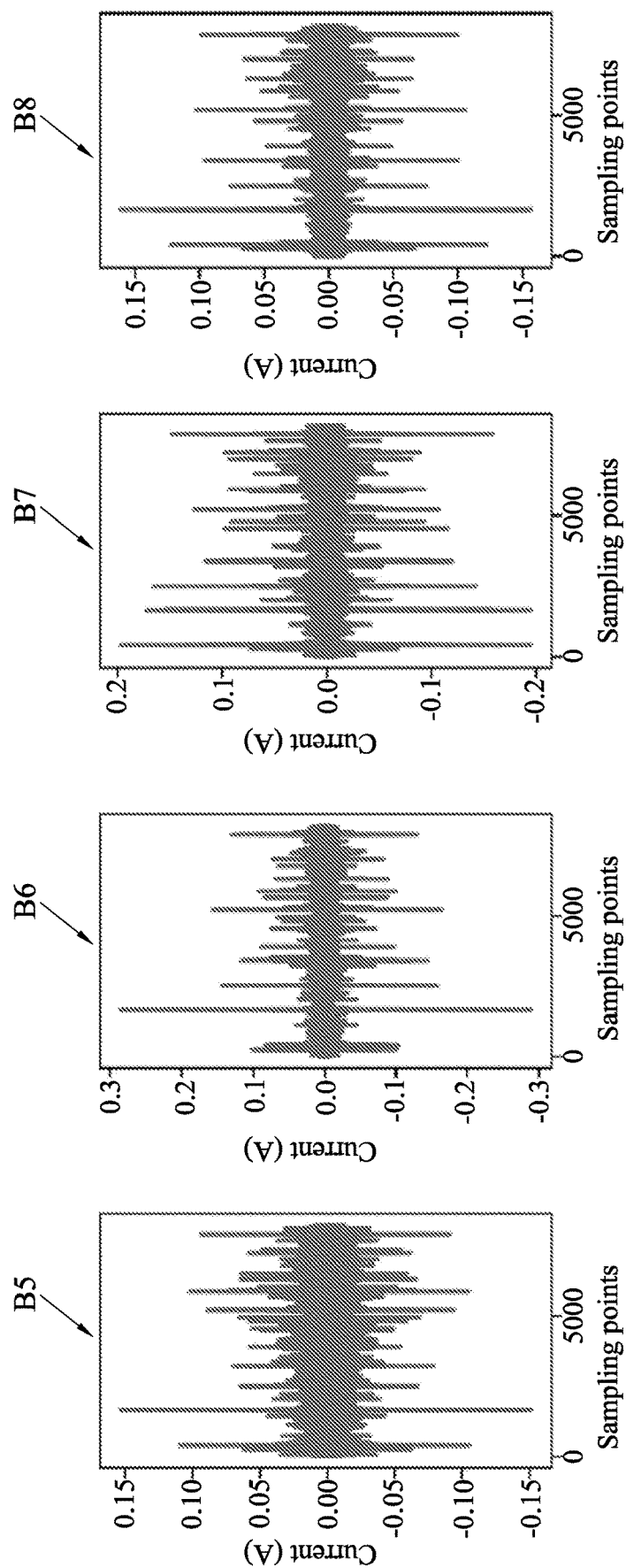
Figure 2C:
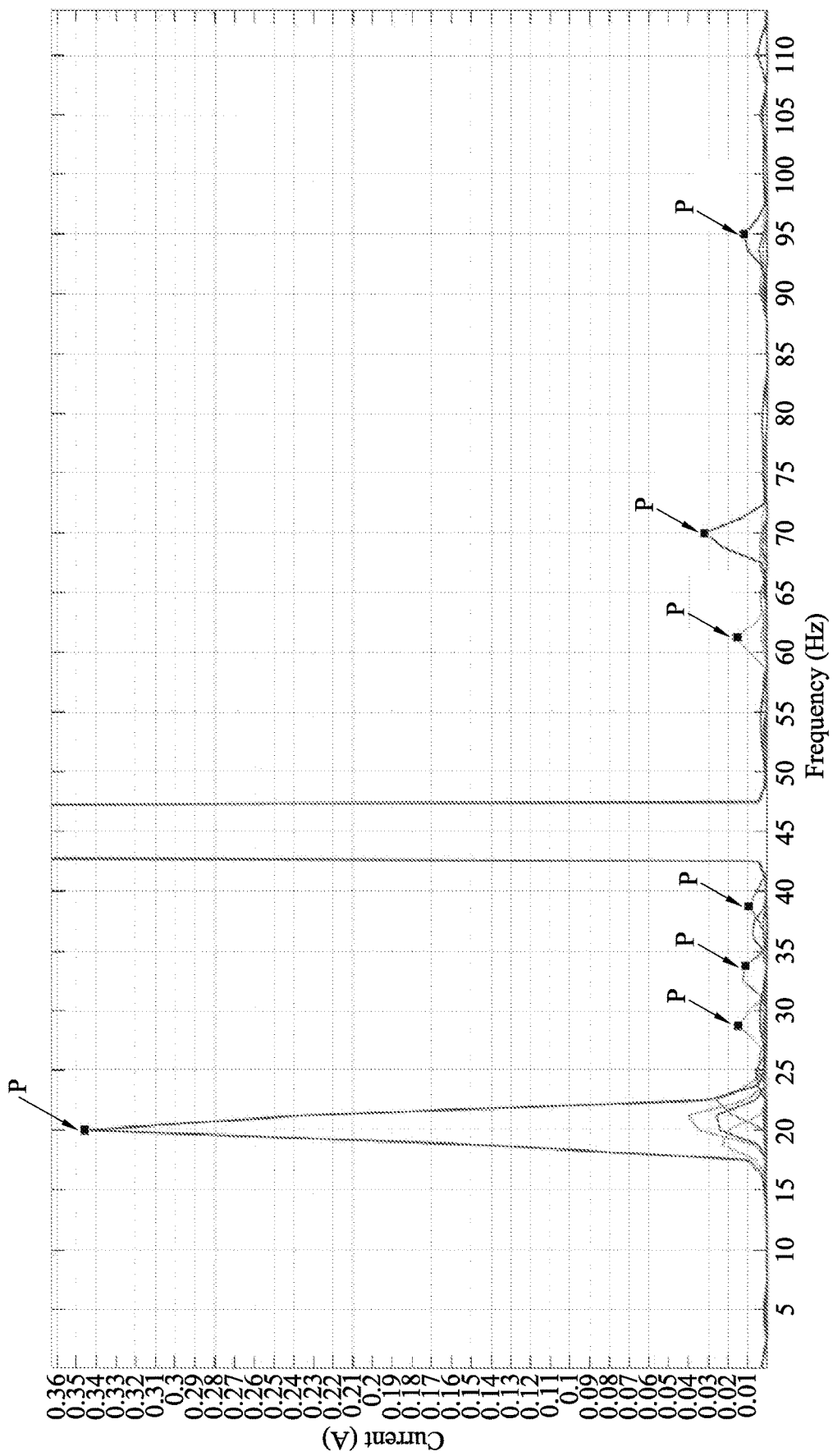
FIG. 2C is a schematic diagram of signature frequencies obtained by Fourier transform of the target current signals of the computing module of FIG. 1A.

Finally, in step S222, relative peak values P of the occurrence positions of the fault frequencies (i.e., signature frequencies) are taken out, as shown in FIG. 2C. It should be understood that the number of the signature frequency peaks may be twenty two or more, or less, and there is no special limitation.

In addition, the MCSA uses the motor stator and rotor induced current as a medium, and detects the current frequency spectrum in one of the three phases of the motor, and identifies the signature frequencies and amplitudes in the signal to distinguish between normal and abnormal motors. Therefore, it can detect such as stator winding, rotor, load efficiency and system load, bearing, power quality, or others.

Figures 1, 2D:
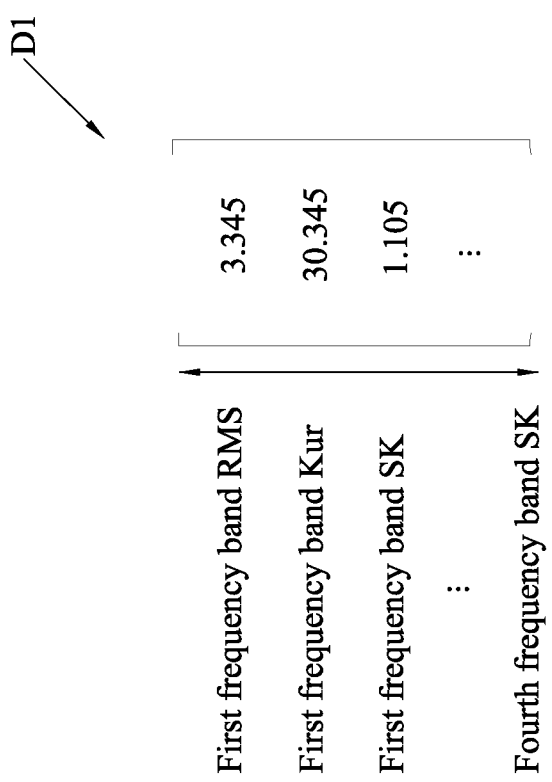
Figures 2, 2D:
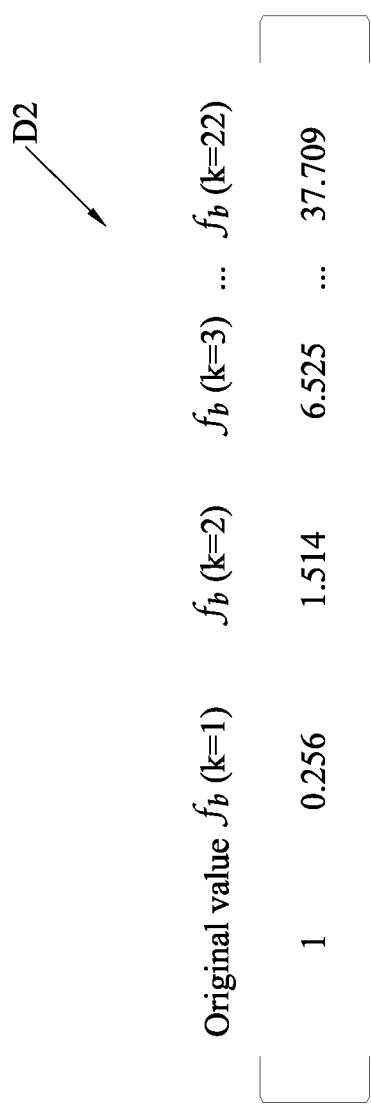
Figures 2, 2D, 3:
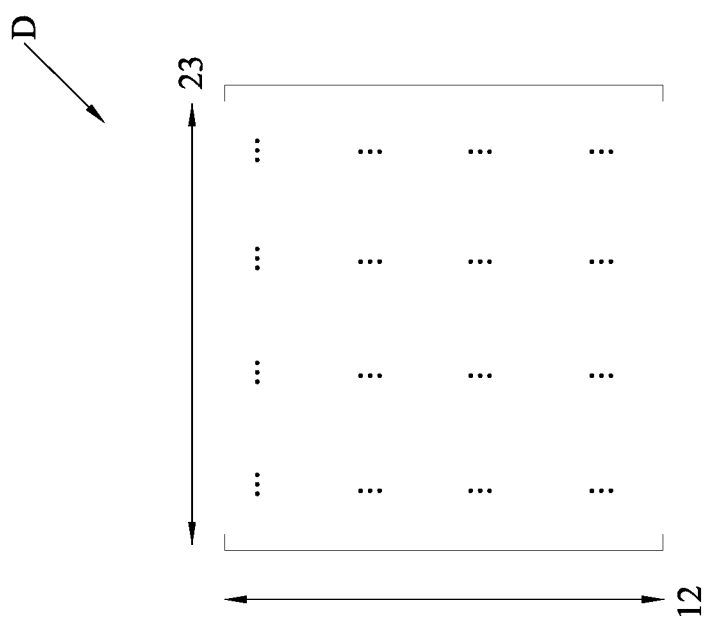
Figure 3:
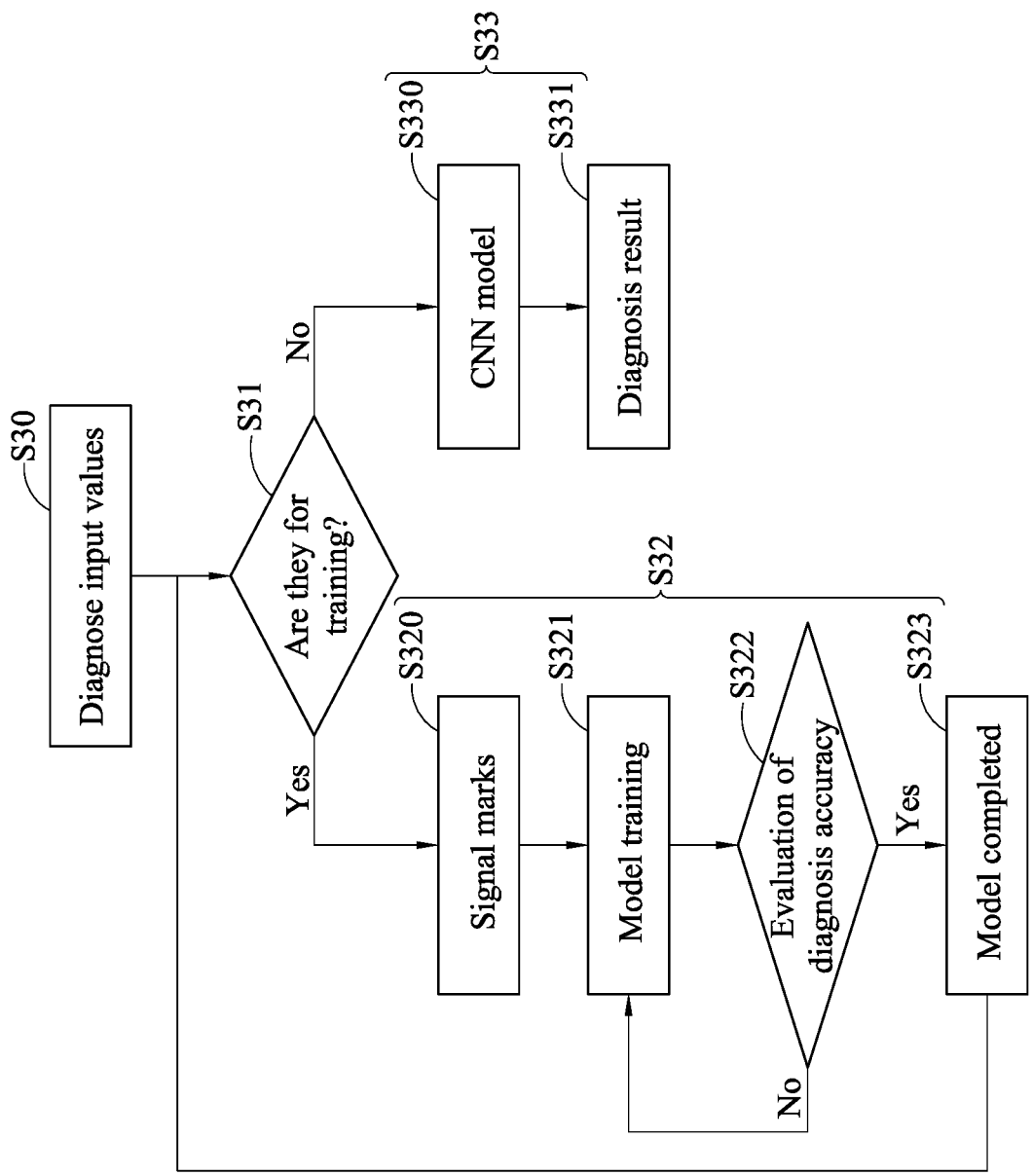
Figure 4:
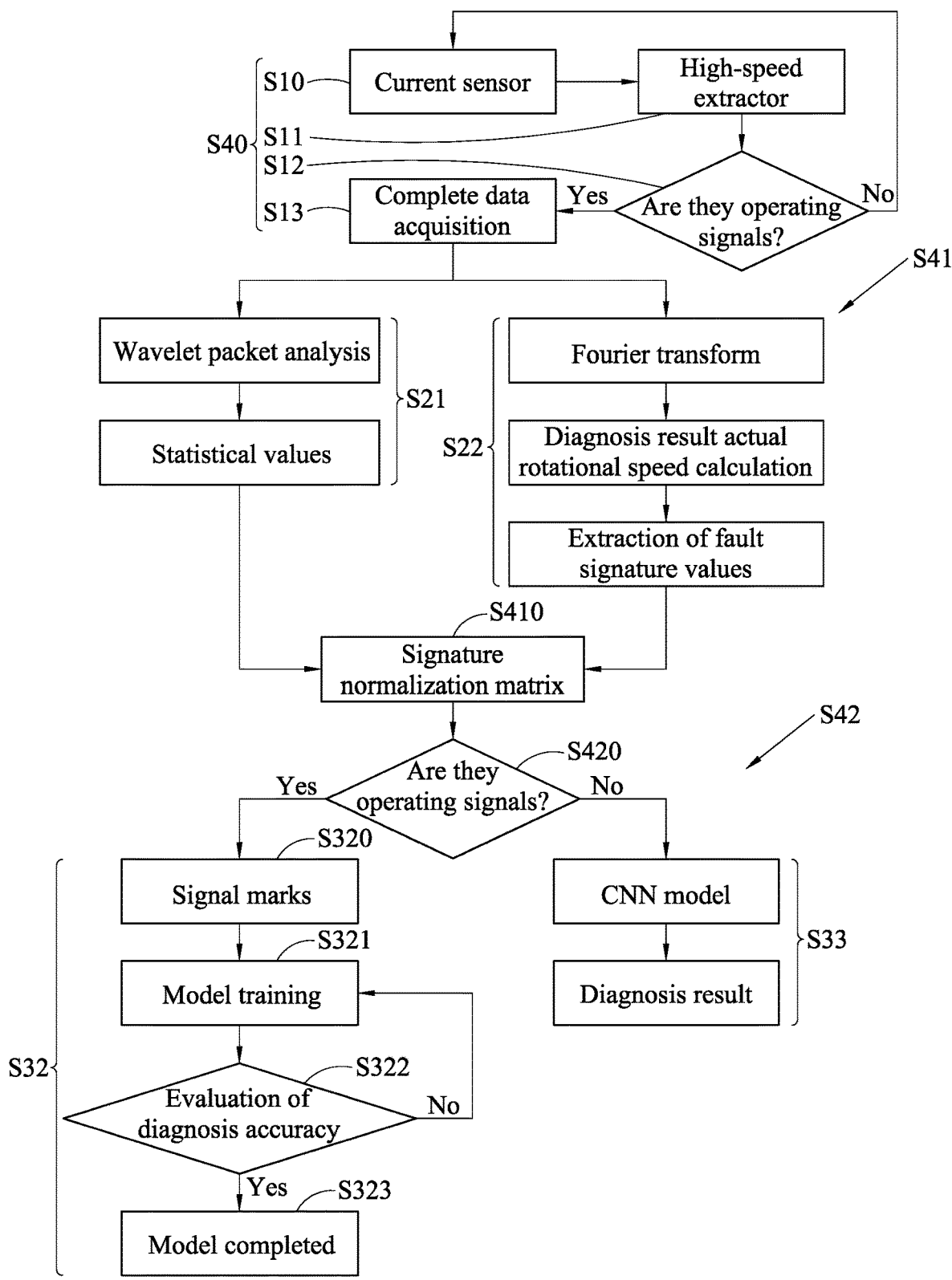

In step S23, the fault signature non-dimensionalization operation is carried out. For example, the twelve statistical values obtained in step S21 (statistics matrix D1 as shown in FIG. 2D-1) and the result obtained in step S22 (frequency matrix D2 as shown in FIG. 2D-2), which includes twenty two signature frequency peaks and an original value (the value is one), are multiplied, that is, the results of the two steps S21 and S22 are multiplied, to obtain a 12×23 signature matrix D, as shown in FIG. 2D-3.

In step S24, the calculation result of the statistical values in step S21 is combined with the extraction result of the signature frequencies in step S22 (the signature matrix D shown in FIG. 2D-3) to carry out normalization operation, so as to establish a target matrix. For example, Min-Max Normalization is performed on the signature matrix D shown in FIG. 2D-3 to obtain the target matrix input to the diagnosis module 12.

The diagnosis module 12 is communicatively connected to the computing module 11 to receive the target matrix, and uses artificial intelligence to diagnose the target matrix to automatically identify whether the target device is in a malfunction state, so that the identification result is used as target information.

In an embodiment, the artificial intelligence method adopts a convolutional neural network (CNN) model or other machine learning models to learn and classify reference matrices representing various current signatures, and in the learning stage, the labeled signatures are used for training, while in the classification stage, the model is directly input for classification. Furthermore, in order to achieve automatic identification and save the time of manually interpreting faults, the embodiment utilizes the CNN model to organize and classify relevant current signals. For example, the CNN model is trained with measured current signals from different motors and gear sets. After the training is completed, a machine learning model suitable for various types of gear sets and motors can be formed for diagnosis operations such as load evaluation, stator windings, bearing damage, eccentricity, gear set failures, etc.

Furthermore, the operation process of the diagnosis module 12 can be referred to FIG. 3 at the same time, and is described as follows.

In step S30 to step S31, a plurality of target matrices are input into the diagnosis module 12 to judge whether to carry out the training operation of the machine learning model. For example, if the target matrices are generated from the 1st to 5000th target current signals, the training operation is performed, as shown in step S32.

In step S32, the CNN model is used for training, as shown in step S320 to step S323, to complete the training of the CNN model. The training and construction of the CNN model are well known in the industry and will not be repeated here.

In step S33, if the target matrix is generated from the 5001th and subsequent target current signals, the diagnosis operation is performed, as shown in step S32.

In an embodiment, in step S320 to step S321, the input values (i.e., the target matrix) are input into a diagnosis model (i.e., the CNN model), so that the CNN model performs diagnosis analysis, such as motor load, motor stator winding damage, motor bearing damage, motor eccentric failure, gear broken tooth failure, gear wear failure, or other diagnosis items, such that the CNN model outputs a diagnosis result as the target information.

Therefore, the diagnosis module 12 can be applied to different types of motors and/or gear sets, so that it is not necessary to use manual comparison information such as conventional failure samples and baselines to know where the various motors and/or gear sets are faulty. Therefore, the device state evaluation system 1 based on the current signals of the present disclosure can analyze the target current signals via the cooperation of the acquisition module 10, the computing module 11 and the diagnosis module 12, so as to evaluate whether the target device is in a malfunction state.

FIG. 4 is a flowchart illustrating a device state evaluation method based on current signals of the present disclosure. In an embodiment, the device state evaluation system 1 is used to implement the device state evaluation method.

First, in step S40, the acquisition module 10 starts to operate, and the operation process of the acquisition module 10 is as shown in FIG. 1B from step S10 to step S13.

Next, in step S41, the computing module 11 starts to operate. In an embodiment, the computing module 11 performs the relevant operations such as step S21 and step S22 at the same time, and then performs the normalization operation of step S410 (such as step S23 to step S24), so as to obtain the target matrix such as the signature normalization matrix (e.g., the 12×23 matrix specification shown in FIG. 2D).

Afterward, in step S42, the diagnosis module 12 starts to operate. In an embodiment, the diagnosis module 12 adopts the process shown in FIG. 3 to obtain target information. Moreover, when the diagnosis module 12 starts to operate, it still needs to judge whether it is the target current signal when the motor is running (or the signal of the training operation of the machine learning model), as in step S420.

In an embodiment, the target information output by the CNN model of the diagnosis module 12 is shown in Table 2.

TABLE 2

| Diagnosis item | Diagnosis result |
| --- | --- |
| Motor load evaluation | 0.1 (0 to 1, the closer to 1, the higher probability of overload) |
| Motor stator winding damage | 0.01 (0 to 1, the closer to 1, the higher the probability of damage) |
| Motor bearing damage | 0.22 (0 to 1, the closer to 1, the higher the probability of damage) |
| Motor eccentric failure | 0.75 (0 to 1, the closer to 1, the higher the probability of damage) |
| Gear broken tooth failure | 0.01 (0 to 1, the closer to 1, the higher the probability of damage) |
| Gear wear failure | 0.01 (0 to 1, the closer to 1, the higher the probability of damage) |

The user can know from the target information in Table 2 that the probability of motor eccentric failure is very high, so the user can easily know that the motor of the target device may have been eccentric and needs to be corrected.

Furthermore, the present disclosure can be used with different motor sizes and gear sets, which can solve the problems of high cost and difficult installation due to the large number of equipment motors on the production line and the need to configure multiple sensors.

Therefore, the method of the present disclosure carries out wavelet packet and MCSA signature processing by the target current signals, and is input into CNN to carry out fault diagnosis, to detect the state of the motor and the gear set. Therefore, it is only necessary to measure the single-phase current to diagnose the stator winding, the bearing damage, the eccentricity, the gear broken tooth failure, or other items.

To sum up, the device state evaluation system and device state evaluation method based on the current signals of the present disclosure can evaluate whether the target device is in a malfunction state by analyzing the target current signals, so the present disclosure can be widely used in various powered target equipment.

For example, for the switch on the train platform, the current RMS value and the MCSA signature ratio are used as the diagnosis basis, which can effectively diagnose the damage of the propulsion motor of the switch; or, when testing the factory equipment system, the statistical values of the wavelet packet time-frequency analysis and the MCSA signature ratio are normalized to evaluate the states of 108 groups of motors, thereby effectively integrating motors with specifications of 0.5 HP to 5 HP.

Therefore, the present disclosure collects the target current signals, uses MCSA and wavelet packet time-frequency analysis to acquire signatures, and distinguishes the states of the motors and the gear sets via the CNN model, so as to achieve the purpose of real-time monitoring of the health states of motors and gear sets.

The foregoing embodiments are used for the purpose of illustrating the principles and effects rather than limiting the present disclosure. Anyone skilled in the art can modify and alter the above embodiments without departing from the spirit and scope of the present disclosure. Therefore, the range claimed by the present disclosure should be as described by the accompanying claims listed below.

What is claimed is:

1. A device state evaluation method based on current signals and applying to a target device that is powered on, the device state evaluation method comprising:
providing a plurality of target current signals corresponding to the target device to a device state evaluation system, wherein the device state evaluation system includes an acquisition module having a first part and a second part, wherein the first part of the acquisition module is a current stabilizing circuit, and the second part of the acquisition module is used for acquiring the plurality of target current signals, wherein an initial information is obtained via a current sensor and is processed by the first part of the acquisition module, and the second part of the acquisition module screens various initial current signals in the initial information to find maximum values of the initial current signals as the plurality of target current signals;
performing a time-frequency domain analysis and processing on the plurality of target current signals to obtain a plurality of statistical values, performing a frequency domain analysis on the plurality of target current signals, and performing a signature extraction operation on signature frequencies of the target device to obtain a frequency matrix;
integrating the plurality of statistical values with the frequency matrix to obtain a target matrix; and
performing a diagnosis operation on the target matrix to identify whether the target device is in a malfunction state, wherein an identification result of the diagnosis operation is used as target information.

2. The device state evaluation method of claim 1, wherein the target device includes a motor and/or a gear set.

3. The device state evaluation method of claim 1, wherein the time-frequency domain analysis and processing is performed on the plurality of target current signals by a wavelet packet decomposition method, and the plurality of statistical values and the frequency matrix are integrated via a normalization operation to obtain the target matrix.

4. The device state evaluation method of claim 1, wherein the device state evaluation system includes a diagnosis module having a machine learning model to perform the diagnosis operation.

5. A device state evaluation system configured in a computer host and based on current signals and applying to a target device that is powered on, the device state evaluation system comprising:
an acquisition module configured to collect a plurality of target current signals corresponding to the target device, and including a first part and a second part, wherein the first part of the acquisition module is a current stabilizing circuit, and the second part of the acquisition module is used for acquiring the plurality of target current signals, wherein an initial information is obtained via a current sensor and is processed by the first part of the acquisition module, and the second part of the acquisition module screens various initial current signals in the initial information to find maximum values of the initial current signals as the plurality of target current signals;
a computing module implemented by the computer host and communicatively connected to the acquisition module to receive the plurality of target current signals, wherein the computing module performs a time-frequency domain analysis and processing on the plurality of target current signals to obtain a plurality of statistical values, performs a frequency domain analysis on the plurality of target current signals, performs a signature extraction operation on signature frequencies of the target device to obtain a frequency matrix, and integrates the plurality of statistical values with the frequency matrix to obtain a target matrix; and
a diagnosis module implemented by the computer host and communicatively connected to the computing module to receive the target matrix and performing a diagnosis operation on the target matrix to identify whether the target device is in a malfunction state, wherein an identification result of the diagnosis operation is used as target information.

6. The device state evaluation system of claim 5, wherein the target device includes a motor and/or a gear set.

7. The device state evaluation system of claim 5, wherein the computing module uses a wavelet packet decomposition method to perform the time-frequency domain analysis and processing, and the plurality of statistical values and the frequency matrix are integrated via a normalization operation to obtain the target matrix.

8. The device state evaluation system of claim 5, wherein the diagnosis module includes a machine learning model to perform the diagnosis operation.

\* \* \* \* \*